United States Patent Office 3,205,251
Patented Sept. 7, 1965

3,205,251
PROCESS FOR PREPARING PHOSPHATE ESTERS WITH A TITANIUM TRICHLORIDE CATALYST
Robert Stephen Mitchell, Webster Groves, Mo., assignor to Monsanto Company, a corporation of Delaware
No Drawing. Filed Nov. 7, 1962, Ser. No. 236,120
15 Claims. (Cl. 260—461)

This invention relates to a novel process for producing organo-phosphate esters. More particularly, this invention is concerned with a process comprising the catalyzed reaction of phosphorus oxyhalides and monohydric organic compounds.

Several methods have been long known to the art for preparing triorgano-phosphates of the type hereinafter described. One of these methods involves the reaction of a phosphorus oxyhalide and a monohydric organic compound without the use of a catalyst. Such a process is not commercially practical because of the need for lengthy reaction times to complete the reaction and the resultant low yields. Another disadvantage of previous processes of this type is the need for the use of excessive amounts of the monohydric organic compound.

Another known method comprises the addition of a tertiary amine to the reaction mixture to produce higher yields. The cost of the amines and the cost of recovering the amines for reuse in the process render this method economically impractical for commercial operation.

In still other methods, the reaction is catalyzed so as to produce greater yields by adding to the reaction mixture a metal such as copper powder, iron filings, calcium, aluminum, magnesium, and the like; or a halide such as aluminum chloride, magnesium chloride, ferric chloride, tin tetrachloride, zinc chloride, boron trifluoride, and the like; or a sulfate such as copper sulfate and the like; or an oxide such as magnesium oxide, copper oxide, and the like.

The employment of these catalysts has several attendant inherent disadvantages, among which are low conversion of the starting materials and lengthy reaction times required for completion of the reaction. As described in United States Patents 2,610,978 and 2,632,018, an insoluble complex forms during the reaction when aluminum chloride is used as a catalyst.

When alcohols are reacted with phosphorus oxychloride either without a catalyst or in the presence of any of the above-mentioned catalysts, other than magnesium chloride, undesirable by-products are formed. These by-products contribute difficult distillation problems, to lower yields of the desired product and to lower reaction efficiency. A known method described in United States Patent 2,410,118 is illustrative of the typical distillation problems encountered. In this method, distillation is difficult due to the concentration of the large amount of salts of various phosphoric acids in the distillation still.

United States Patent 2,868,827 describes the use of titanium tetrachloride as a catalyst for producing triorgano-phosphates. Disadvantages encountered employing titanium tetrachloride reside in the excessive and lengthy reaction times necessary to obtain desirable yields and the relatively large amounts of the metal halide catalyst required.

Accordingly, it is a primary object of this invention to provide a novel and improved catalytic process for the preparation of triorgano-phosphates in which the attendant disadvantages of the prior art are eliminated. More specifically, it is an object of this invention to provide a novel process in which the time required for completion of the reaction is relatively short. A still further object of this invention is to provide a process for the more facile and inexpensive production of the desired phosphorus triesters in high yields.

These and still other objects, features, and advantages will become apparent from the following detailed description. In accordance with the invention, a phosphorus oxyhalide is reacted with a monohydric organic compound in the presence of titanium trichloride. The reaction proceeds smoothly over a substantial temperature range, while the catalyst displays no tendency to interfere.

Among the phosphorus compounds useful as starting materials in this process are phosphorus oxychloride, phosphorus oxybromide, and the substituted derivatives thereof. Such derivatives include those wherein one or two of the halogen atoms are replaced by a corresponding number of hydrocarbon radicals or halogenated hydrocarbon radicals, said radicals being either directly connected to the phosphorus atom or connected to said atom through an oxygen atom. Exemplary phosphorus compounds which may be employed comprise the phosphorus oxyhalides such as phosphorus oxychloride and phosphorus oxybromide; the mixed oxyhalides such as phosphorus oxydibromide chloride and phosphorus oxydichloride bromide; the alkylated halophosphates such as monoethyl dichlorophosphate, dipropyl bromophosphate, mono-(2-ethylhexyl)dichlorophosphate, and didecyl chlorophosphate; the alicyclic halophosphates such as cyclopentyl dichlorophosphate and dicyclohexyl chlorophosphate; the aryl halophosphates such as phenyl dichlorophosphate and diphenyl bromophosphate; the aralkyl halophosphates such as p-ethylphenyl dichlorophosphate and cresyl dichlorophosphate; the haloalkyl and haloaryl halophosphates such as 2-bromoethyl dibromophosphate, di-(2-chloropropyl)chlorophosphate, p-chlorophenyl dichlorophosphate, di-(p-bromophenyl)bromophosphate, and p-chlorophenyl dibromophosphate; the diol halophosphates such as 1,3-butanediol monochlorophosphate, 1,3-hexanediol monochlorophosphate, and 1,4-butanediol bis-(dichlorophosphate); and other substituted phosphorus oxyhalides such as methoxyethyl dichlorophosphate, ethoxypropyl dichlorophosphate, and phenoxyethyl dichlorophosphate. It should also be noted that, where desired, the corresponding halophosphonates may be employed.

The monohydroxy organic compounds which can be used in the process of this invention are the monohydroxy aliphatic primary alcohols, examples of which are the alkanols, such as n-pentanol, isopentanol, n-hexanol, isohexanol, 2-ethylbutanol-1, 2,2,4-trimethylpentanol, n-heptanol, n-octanol, 2-ethylhexanol, isoctanol, nonanol, isononanol, n-decanol, isodecanol, n-dodecanol, 2-butyloctanol-1, tridecanol, tetradecanol, pentadecanol, octadecanol, β-phenylethanol, cyclohexylmethanol, cyclohexylethanol, cyclohexylbutanol; the monohydric phenols such as phenol, o-cresol, m-cresol, p-cresol, mixed cresols, o-ethylphenol, m-ethylphenol, p-ethylphenol, 2-n-propylphenol, 3-n-propylphenol, 4-n-propylphenol, 2-isopropylphenol, 3-isopropylphenol, 4-isopropylphenol, 2-n-butylphenol, 3-n-butylphenol, 4-n-butylphenol, di-sec.-butylphenol, 4-tert.-butylphenol, diisobutylphenol, 4-tert.-amylphenol, p-n-hexylphenol, p-n-heptylphenol, octylphenol, p-tert.-octylphenol, nonylphenol, dodecylphenol, 3-pentadecylphenol, 2,3-dimethylphenol, 3,4-dimethylphenol, 2,4-dimethylphenol, 3,5-dimethylphenol, 2,5-dimethylphenol, mixed dimethylphenols, 3-methyl-6-isopropylphenol, 3-methyl-5-isopropylphenol, 3-methyl-4-isopropylphenol, 2-methyl-4-isopropylphenol, 2-methyl-5-isopropylphenol, 5-methyl-2-isopropylphenol, 2-methyl-4-n-butylphenol, 3-methyl-6-n-butylphenol, 4-methyl-6-n-butylphenol, 3-methyl-6-tert.-butylphenol, 4-methyl-6-tert.-butylphenol, 2,4,5-trimethylphenol, 2,3,5-trimethylphenol, 3,4,5-trimethylphenol, 2,3,4-trimethylphenol, and the like.

Moreover, while specific straight and branched chain primary alcohols have been described for the purpose of illustration, all of the isomeric forms of these primary alcohols and mixtures thereof are also suitable for use in the process of this invention. The highest yields have been found to be obtainable from the primary aliphatic alcohols which are substituted in the 2-position.

It is to be noted that the process of this invention is not limited in any manner by the particular source of said alcohols, whether such sources be natural or synthetic. Thus, for example, the alcohols can be produced by the Oxo synthesis, or can be produced by the hydration of olefins or the oxidation of petroleum fractions, or can be produced by the catalytic hydrogenation of coconut oil.

The reaction of the process of this invention proceeds according to the following equation, which illustrates typical starting materials:

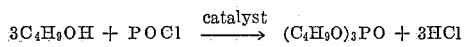

$$3C_4H_9OH + POCl_3 \xrightarrow{catalyst} (C_4H_9O)_3PO + 3HCl$$

The amount of alcohol employed may be in substantial excess of the quantity which would be required by theory to insure that all of the halogen substituents connected to the phosphorus atom either directly or through an oxygen atom will react. Such excess can comprise from about 5% up to as much as 50% of the theoretical amount. However, it should be pointed out that the reaction will proceed in the presence of the stoichiometric quantity of alcohol.

The titanium trichloride catalyst used in the process of this invention is found to be suitable over a fairly wide range of quantities. It has been determined that as little as 0.005% by weight of the catalyst, based upon the weight of the monohydroxy organic starting material, will serve to insure reaction. The upper percentage limit will be primarily dependent upon practical and economic considerations, amounts up to at least 10% having been found suitable. For most reactions, it is preferred to employ a catalyst concentration of from about 0.5% to about 3% by weight based upon the weight of the starting monohydroxy organic compound. Both the technical grades and commercially pure grades of the catalytic material work equally well.

In practicing the process of this invention, the alcohol and titanium trichloride are placed in the reactor, and the phosphorus oxyhalide is added. Those skilled in the art will recognize that the process is not limited to specific reaction temperatures, since the reaction can be carried out at temperatures of from about 0° C. to temperatures of about 200° C. The preferred temperature range varies from about 5° C. to 95° C. Upon completion of the reaction, the desired phosphorus product is recovered by methods well known to those skilled in the art. For example, the reaction mixture is then washed successively with acid, water, and aqueous sodium carbonate, steam sparged and finally vacuum dried to yield the phosphorus product.

The invention will be more fully understood by reference to the following examples. Such examples, however, are given for the purpose of illustration only, and are not to be construed as limiting the scope of the present invention in any way.

*Example I*

A suitable reactor is charged with 214.8 grams (1.65 mols) of 2-ethylhexanol followed by 5.6 grams of titanium trichloride. There is then added 76.7 grams (0.5 mol) of phosphorus oxychloride over a period of about one hour. The mixture is maintained at 10–14° C. during the addition of the phosphorus oxychloride. The pressure is then reduced to 30 mm. Hg, and the reaction mixture is heated to 70° C. to insure completion of the reaction. This temperature and pressure are maintained for two hours. The resultant reaction mixture is then washed successively with an acid, several times with water, and finally with aqueous sodium carbonate. Said mixture is steam sparged under vacuum and dried. There is obtained 202.6 grams (93.2% of theory) of tri-2-ethylhexyl phosphate.

*Example II*

The procedure of Example I is followed except that 0.01 gram of titanium trichloride is used. A yield of 51.1 grams of tri-2-ethylhexyl phosphate is obtained.

*Example III*

A suitable reactor is charged with 165.4 grams (0.825 mol) of tridecanol followed by 3.3 grams of titanium trichloride. There is then added 38.4 grams (0.25 mol) of phosphorus oxychloride over a period of about one-half hour. The mixture is maintained at 12–20° C. during the addition of the phosphorus oxychloride. The pressure is reduced to 100 mm. Hg, and the reaction mixture is heated to about 50° C. This temperature and pressure are maintained for three hours. The resultant reaction mixture is then washed successively with an acid, several times with water, and finally with aqueous sodium carbonate. The reaction mixture is steam sparged under vacuum and dried. Tri-(tridecyl)phosphate is obtained in good yield.

*Examples IV–VIII*

Following the procedure of Example I, 1.65 mols of each of the monohydroxy aliphatic primary alcohols tabulated below is substituted for the 2-ethylhexanol. The product obtained in each instance is as indicated:

IV

Alcohol=butanol
Product=tributyl phosphate.

V

Alcohol=isohexanol
Product=triisohexyl phosphate.

VI

Alcohol=n-octanol
Product=tri-n-octyl phosphate.

VII

Alcohol=β-phenylethanol
Product=tri-β-phenylethyl phosphate.

VIII

Alcohol=2,2,4-trimethylpentanol
Product=tri-(2,2,4-trimethylpentyl)-phosphate.

*Example IX*

A suitable reactor is charged with 76.7 grams (0.50 mol) of phosphorus oxychloride. There is then added 65.1 grams (0.50 mol) of isooctanol over a period of about one hour. The mixture is maintained at 10–20° C. during the addition of the isooctanol. The pressure is then reduced to 45 mm. Hg for two hours to insure completion of the reaction.

One hundred twenty-two and nine-tenths grams of the isooctyl phosphoro-dichloridate thus prepared is added over a period of 1½ hours to a reactor charged with 143.2 grams (1.1 mols) of 2-ethylhexanol and 7.9 grams of titanium trichloride. The temperature of the reaction mixture is maintained at 10–15° C. during the addition of the isooctyl phosphoro-dichloridate.

The pressure is then reduced to 70 mm. Hg and the reaction mixture is heated to about 95° C. for about one hour to insure completion of the reaction. The resultant reaction mixture is then washed successively with an acid, several times with water, and finally with aqueous sodium carbonate. The reaction mixture is steam sparged under vacuum and dried. There is obtained 173.1 grams (80.0% of theory) of isooctyl-di-2-ethylhexyl phosphate.

Example X

Following the procedure of Example I, 107.5 grams (0.825 mol) of 2-ethylhexanol, 2.2 grams of titanium trichloride, and 71.7 grams (0.25 mol) of phosphorus oxybromide are used to prepare tri-2-ethylhexyl phosphate in good yield.

Example XI

A suitable reactor is charged with 214.8 grams (1.65 mols) of isooctanol and 6.6 grams of titanium trichloride. Seventy-six and seven-tenths grams (0.5 mol) of phosphorus oxychloride is added over a period of about one-half hour while the temperature is maintained at 5–10° C. The pressure is reduced to 20 mm. Hg and the reaction mixture is heated to about 95° C. to insure completion of the reaction. This temperature and pressure are maintained for three hours. The resultant reaction mixture is then washed successively with an acid and several times with water. The reaction mixture is steam sparged at atmospheric pressure to remove the remaining alcohol, and is finally dihydrated under vacuum. There is obtained 178.0 grams of triisooctyl phosphate.

Example XII

A suitable reactor is charged with 307.4 grams (1.65 mols) of 2-butyloctanol and 7.0 grams of titanium trichloride. Seventy-six and seven-tenths grams (0.5 mol) of phosphorus oxychloride is added over a period of about one hour while the temperature is maintained at about 5–10° C. The reaction mixture is then worked up in the manner of the preceding examples to give 274.6 grams of tri-2-butyloctyl phosphate.

Example XIII

A suitable reactor is charged with 173.6 grams (1.55 mols) of cresylic acid followed by 3.4 grams of titanium trichloride. There is then added 76.7 grams (0.5 mol) of phosphorus oxychloride over a period of about one hour. The mixture is maintained at 60° C. during the addition of the phosphorus oxychloride. Upon completion of the addition of the phosphorus oxychloride, the temperature of the reaction mixture is raised slowly to 135° C. to insure completion of the reaction. The reaction mixture is then washed successively several times with acid, water, and aqueous sodium hydroxide. The reaction mixture is dried. There is obtained 168.3 grams (96.9% of theory) of tricresyl phosphate.

Example XIV

A suitable reactor is charged with 168.6 grams (1.65 mols) of 2-ethylbutanol followed by 1.7 grams of titanium trichloride. There is then added 76.7 grams (0.5 mol) of phosphorus oxychloride over a period of about one-half hour. The mixture is maintained at 15–20° C. during the addition of the phosphorus oxychloride. The pressure is then reduced to 40–50 mm. Hg, and the reaction mixture is heated to 90° C. to insure completion of the reaction. This temperature and pressure are maintained for about five hours. The resultant reaction mixture is then washed successively with an acid, several times with water, and finally with aqueous sodium carbonate. Said mixture is steam sparged under vacuum and dried. There is obtained 151.2 grams (86.2% of theory) of tri-2-ethylbutyl phosphate.

It is to be understood that, as employed in the preceding description and the ensuing claims, the term "halogen" and the derivatives thereof include chlorine, bromine, fluorine, and iodine.

While this invention has been described with respect to certain embodiments, it is not so limited, and it is to be understood that variations and modifications may be made which are obvious to those skilled in the art without departing from the spirit or scope of this invention.

The embodiments of the invention in which an exclusive property or privilege is claimed are defined as follows:

1. In a process for preparing a triorgano-phosphate which comprises reacting a monohydric organic compound selected from the group consisting of monohydric saturated aliphatic primary alcohols having 5 to 18 carbon atoms; phenol and substituted phenols having 1 to 3 alkyl substituents, said alkyl substituents containing 1 to 18 carbon atoms and said substituted phenols having at least one unsubstituted ortho position, with a halogenated phosphorus compound selected from the class consisting of phosphorus oxyhalides and derivatives of such oxyhalides having from one to two of the halogen atoms substituted by a like number of radicals selected from the group consisting of hydrocarbon radicals and halogenated hydrocarbon radicals directly connected to the phosphorus atom, hydrocarbon radicals and halogenated hydrocarbon radicals connected to the phosphorus atom through an oxygen atom, the improvement which comprises carrying out the reaction in the presence of a catalytic amount of titanium trichloride.

2. The process of claim 1 wherein the reaction temperature is from about 0 to 200° C.

3. The process of claim 1 wherein the reaction temperature is from about 5 to 95° C.

4. The process of claim 1 wherein the concentration of titanium trichloride is from about 0.005% to 10% by weight based upon the weight of the monohydroxy organic compound.

5. The process of claim 1 wherein the concentration of titanium trichloride is from about 0.5% to 3.0% by weight based upon the weight of monohydroxy organic compound.

6. In a process for preparing a triorgano-phosphate which comprises reacting a monohydric saturated aliphatic primary alcohol having 5 to 18 carbon atoms with a halogenated phosphorus compound selected from the class consisting of phosphorus oxyhalides and derivatives of such oxyhalides having from one to two of the halogen atoms substituted by a like number of radicals selected from the group consisting of hydrocarbon radicals and halogenated hydrocarbon radicals directly connected to the phosphorus atom, hydrocarbon radicals and halogenated hydrocarbon radicals connected to the phosphorus atom through an oxygen atom, the improvement which comprises carrying out the reaction in the presence of a catalytic amount of titanium trichloride.

7. The process of claim 6 wherein the reaction temperature is from about 0 to 200° C., and the titanium trichloride concentration is from about 0.005% to about 10% by weight based upon the weight of the monohydric aliphatic primary alcohol.

8. The process of claim 6 wherein the reaction temperature is from about 5 to 95° C., and the titanium trichloride concentration is from about 0.5% to about 3.0% by weight based upon the weight of the monohydric aliphatic primary alcohol.

9. The process of claim 6 wherein the monohydric aliphatic alcohol is a 2-substituted monohydric aliphatic primary alcohol.

10. In a process for preparing triorgano-phosphate which comprises reacting a monohydric phenol selected from the group consisting of phenol and substituted phenols having 1 to 3 alkyl substituents, said alkyl substituents containing 1 to 18 carbon atoms and said substituted phenols having at least one unsubstituted ortho position with a halogenated phosphorus compound selected from the class consisting of phosphorus oxyhalides and derivatives of such oxyhalides having from one to two of the halogen atoms substituted by a like number of radicals selected from the group consisting of hydrocarbon radicals and halogenated hydrocarbon radicals connected directly to the phosphorus atom, hydrocarbon radicals and halogenated hydrocarbon radicals connected to the phosphorus atom through an oxygen atom, the improvement which comprises carrying out the reaction in the presence of a catalytic amount of titanium trichloride.

11. The process of claim 10 wherein the reaction temperature is from about 0 to 200° C., and the titanium trichloride concentration is from about 0.005% to about 10% by weight based upon the weight of the monohydric phenol.

12. The process of claim 11 wherein the reaction temperature is from about 5 to 95° C., and the titanium trichloride concentration is from about 0.5% to about 3.0% by weight based upon the weight of the monohydric phenol.

13. The process for preparing tri-2-ethylhexyl phosphate which comprises reacting 2-ethylhexanol with phosphorus oxychloride, the improvement which comprises carrying out the reaction in the presence of a catalytic amount of titanium trichloride.

14. The process for preparing tri-2-ethylbutyl phosphate which comprises reacting 2-ethylbutanol with phosphorus oxychloride, the improvement which comprises carrying out the reaction in the presence of a catalytic amount of titanium trichloride.

15. The process for preparing tri-2-butyloctyl phosphate which comprises reacting 2-butyloctanol with phosphorus oxychloride, the improvement which comprises carrying out the reaction in the presence of a catalytic amount of titanium trichloride.

References Cited by the Examiner

UNITED STATES PATENTS 2,868,827    1/59    O'Connor et al. _____ 260—461

CHARLES B. PARKER, *Primary Examiner.*

IRVING MARCUS, *Examiner.*